US012670784B2

(12) United States Patent
Ma et al.

(10) Patent No.: US 12,670,784 B2
(45) Date of Patent: Jun. 30, 2026

(54) SYSTEMS AND METHODS FOR IDENTIFYING AND RANKING TRAFFIC BOTTLENECKS

(71) Applicant: Geotab Inc., Oakville (CA)

(72) Inventors: Yunfei Ma, Hamilton (CA); Chien An Liu, Mississauga (CA)

(73) Assignee: Geotab Inc., Oakville (CA)

( * ) Notice: Subject to any disclaimer, the term of this patent is extended or adjusted under 35 U.S.C. 154(b) by 155 days.

(21) Appl. No.: 18/502,616

(22) Filed: Nov. 6, 2023

(65) Prior Publication Data

US 2024/0161606 A1 May 16, 2024

Related U.S. Application Data

(60) Provisional application No. 63/456,286, filed on Mar. 31, 2023, provisional application No. 63/424,553, filed on Nov. 11, 2022.

(51) Int. Cl.
*G08G 1/01* (2006.01)
*G06Q 50/40* (2024.01)

(52) U.S. Cl.
CPC ........... *G08G 1/0133* (2013.01); *G06Q 50/40* (2024.01)

(58) Field of Classification Search
CPC ................. G06Q 50/40; G08G 1/0104; G08G 1/096791; G08G 1/0141; G08G 1/01; G01C 21/34
See application file for complete search history.

(56) References Cited

U.S. PATENT DOCUMENTS 7,440,842 B1 * 10/2008 Vorona ............. G08G 1/096791 340/995.13
7,613,564 B2 11/2009 Vorona
(Continued)

OTHER PUBLICATIONS

Akhil Anil Rajput et al: "Anatomy of Perturbed Traffic Networks during Urban Flooding", arxiv.org, Cornell University Library, 201 Olin Library Cornell University Ithaca, NY 14853, Oct. 2, 2022 (Oct. 2, 2022), XP091332452.
(Continued)

*Primary Examiner* — Yuri Kan
(74) *Attorney, Agent, or Firm* — Gabriel F. Rogers

(57) ABSTRACT

Disclosed herein are systems and methods for identifying and ranking traffic bottlenecks. An example of such methods may include operating at least one processor to: receive traffic data associated with a road network comprising a plurality of road segments, the traffic data comprising vehicle speed data collected from a plurality of vehicles operating within the road network; determine a benchmark speed for each of the plurality of road segments; determine, for each of the plurality of road segments, whether a traffic disruption is present by comparing the benchmark speed thereof to vehicle speed data collected from at least one vehicle operating therealong; determine, for each of the plurality of road segments having the traffic disruption therealong, one or more road segment metrics associated therewith; identify a traffic bottleneck by aggregating a plurality of adjacent road segments having traffic disruptions therealong and the one or more road segment metrics associated therewith; and rank each traffic bottleneck based on one or more aggregated road segment metrics associated therewith.

13 Claims, 6 Drawing Sheets

(56) References Cited

U.S. PATENT DOCUMENTS

| | | | | |
|---|---|---|---|---|
| 8,825,356 | B2 * | 9/2014 | Vorona | G08G 1/0104 701/119 |
| 9,286,795 | B2 * | 3/2016 | Vorona | G08G 1/0104 |
| 9,361,800 | B2 | 6/2016 | Vorona | |
| 9,773,410 | B2 | 9/2017 | Vorona | |
| 10,930,143 | B2 * | 2/2021 | Linder | G01C 21/34 |
| 2019/0114909 | A1 * | 4/2019 | Halama | G08G 1/0141 |

OTHER PUBLICATIONS

Extended European Search Report for European Application No. 23205835.4, mailed Mar. 5, 2024, 9 pages.

* cited by examiner

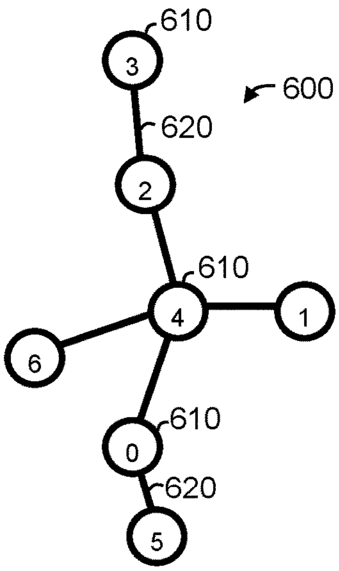
FIG. 6A
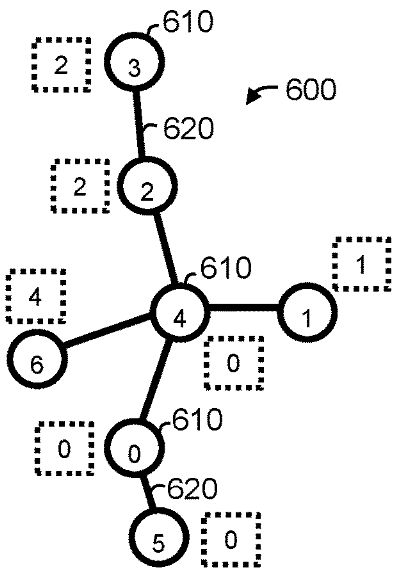
FIG. 6B
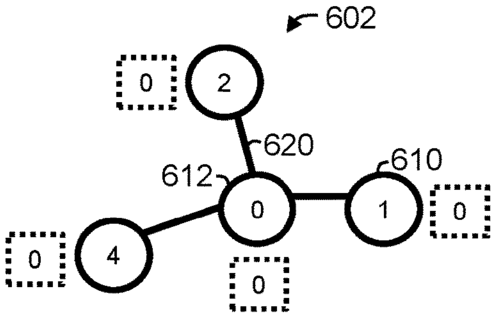
FIG. 6C
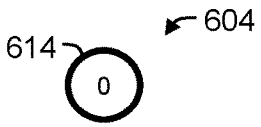
FIG. 6D
FIG. 6

SYSTEMS AND METHODS FOR IDENTIFYING AND RANKING TRAFFIC BOTTLENECKS

CROSS-REFERENCE TO RELATED APPLICATIONS

This application claims priority to and the benefit of U.S. Patent Application Ser. No. 63/424,553, filed on Nov. 11, 2022, and U.S. Patent Application Ser. No. 63/456,286, filed on Mar. 31, 2023, each of which are hereby incorporated by reference in their entirety.

TECHNICAL FIELD

The present disclosure generally relates to identification of traffic disruptions. More specifically, the present disclosure relates to identifying and ranking traffic bottlenecks.

BACKGROUND

Traffic bottlenecks generally refer to localized disruptions of vehicular traffic on infrastructure such as streets, roads, highways, etc. Traffic bottlenecks may be caused by a variety of factors, including physical and psychological factors. Physical factors that may lead to traffic bottlenecks include road design (e.g., narrowing of highways), traffic light timing, terrain (e.g., uphill sections or sharp curves on a roadway), and temporary events such as construction zones, traffic accidents, and slow-moving vehicles. "Rubbernecking" is a common example of a psychological factor induced traffic bottleneck and generally refers to the tendency of drivers to slow down while passing an event (e.g., a traffic accident or a vehicle stopped by law enforcement) for better observation.

As will be appreciated, not only do traffic bottlenecks affect personal travel, but they also affect commercial activities. For example, traffic bottlenecks may affect the ability of freight transport trucks, delivery vehicles, mobile maintenance services (e.g., AAA, CAA, home maintenance services, etc.), and the like to reach their destination within a desired timeframe, which may, in turn, result in one or more economic losses for the businesses associated therewith and, as a result, price inflations for consumers.

The identification of traffic bottlenecks is therefore of interest to various industries. However, conventional methods for doing so have generally been limited. For example, conventional methods typically focus on short-term recurrent and non-recurrent traffic disruptions in relatively small geographical locations, which, as will be appreciated, may not be useful for commercial users such as freight transport companies that manage a vehicle fleet operating across a wide geographical area. Conventional methods also typically use metrics such as speed and/or hourly volume to analyse traffic bottlenecks, which may not be useful for accurate determination of factors such as economic loss caused by delays. As well, conventional methods typically limit their analysis to traffic bottlenecks on specific types of roadways (e.g., highways), ignoring more-complex road networks, which, as will be appreciated, are often used for a variety of commercial activities.

Thus, a need exists for improved systems and methods for identifying traffic bottlenecks.

SUMMARY

In one aspect, the present disclosure relates to a system for identifying and ranking traffic bottlenecks, the system comprising: at least one data storage operable to store traffic data associated with a road network comprising a plurality of road segments, the traffic data comprising vehicle speed data collected from a plurality of vehicles operating within the road network; and at least one processor in communication with the at least one data storage, the at least one processor operable to: determine a benchmark speed for each of the plurality of road segments; determine, for each of the plurality of road segments, whether a traffic disruption is present by comparing the benchmark speed thereof to vehicle speed data collected from at least one vehicle operating therealong; determine, for each of the plurality of road segments along which a traffic disruption is present, one or more road segment metrics associated therewith; identify a traffic bottleneck by aggregating a plurality of adjacent road segments having a traffic disruption therealong and the one or more road segment metrics associated therewith; and rank each traffic bottleneck based on one or more aggregated road segment metrics associated therewith.

According to an embodiment, the road network is defined by a plurality of nodes interconnected by one or more edges, each node representing a road segment intersection and having a unique node ID associated therewith, and each edge representing at least a portion of one of the plurality of road segments.

According to an embodiment, the at least one processor is operable to identify the traffic bottleneck by: identifying each node of the plurality of nodes that is interconnected with one or more edges having a traffic disruption therealong; generating an undirected graph comprising the one or more edges having a traffic disruption therealong and each node interconnected therewith; and generating a compressed undirected graph comprising an aggregated node having associated therewith the one or more aggregated road segment metrics based on the one or more road segment metrics associated with each road segment represented by the one or more edges having a traffic disruption therealong.

According to an embodiment, the at least one processor is operable to generate the compressed undirected graph by: for each node of the undirected graph, modifying the node ID associated therewith to that of a minimum adjacent node ID, if present; merging nodes having identical node IDs to generate one or more merged nodes, each of the one or more merged nodes having associated therewith the one or more road segment metrics associated with each road segment represented by each edge interconnecting the nodes prior to merging; and repeating the modifying of the node IDs and the merging of the nodes having the identical node IDs until the compressed undirected graph comprising the aggregated node is generated.

According to an embodiment, the at least one processor is operable to generate the undirected graph by interconnecting proximate nodes between which at least a portion of a road segment is present by adding an omitted edge therealong.

According to an embodiment, the one or more road segment metrics comprise a speed metric, a travel time metric, a dimension metric, a direction metric, a load metric, a traffic disruption metric, or a combination thereof.

According to an embodiment, the traffic disruption metrics comprises a weight-based temporal delay cost.

According to an embodiment, the one or more aggregated road segment metrics comprise an aggregated travel time metric, an aggregated speed metric, an aggregated direction metric, an aggregated load metric, an aggregated traffic disruption metric, an aggregated dimension metric, an aggregated travel time metric, a travel time index (TTI), a buffer time index (BTI), a planning time index (PTI), a reliability cost, a bottleneck concentration, or a combination thereof.

According to an embodiment, the at least one processor is operable to rank each traffic bottleneck based on a utility function that uses at least the one or more aggregated road segment metrics as factors thereof.

According to an embodiment, the utility function uses, in addition to the one or more aggregated road segment metrics, one or more social costs as a factor thereof.

According to an embodiment, the at least one processor is operable to rank each traffic bottleneck based on a utility function that uses, as a factor thereof, one or more economic costs based on the one or more aggregated road segment metrics, and, optionally, one or more social costs.

According to an embodiment, the one or more social costs comprise a volume of greenhouse gas emissions, a unit social cost for emission of greenhouse gas, a predicted market share in terms of greenhouse gas emissions, or a combination thereof.

According to an embodiment, the traffic data comprises speed limit data associated with at least one of the plurality of road segments.

According to an embodiment, the traffic data comprises vehicle speed data collected from a plurality of vehicles operating within the road network over a period of time.

According to an embodiment, the period of time is at least a month.

According to an embodiment, the at least one processor is operable to determine the benchmark speed based on a road segment speed limit and/or a maximum collected road segment vehicle speed.

According to an embodiment, the benchmark speed is a minimum of the road segment speed limit and the maximum collected road segment vehicle speed.

According to an embodiment, the maximum collected road segment vehicle speed is a maximum of an 85th percentile collected road segment vehicle speed.

According to an embodiment, the at least one processor is operable to determine whether the traffic disruption is present by determining whether a collected road segment vehicle speed is less than the benchmark speed.

According to an embodiment, the plurality of vehicles are freight transport vehicles.

In another aspect, the present disclosure relates to a method for identifying and ranking traffic bottlenecks, the method comprising operating at least one processor to: receive traffic data associated with a road network comprising a plurality of road segments, the traffic data comprising vehicle speed data collected from a plurality of vehicles operating within the road network; determine a benchmark speed for each of the plurality of road segments; determine, for each of the plurality of road segments, whether a traffic disruption is present by comparing the benchmark speed thereof to vehicle speed data collected from at least one vehicle operating therealong; determine, for each of the plurality of road segments along which a traffic disruption is present, one or more road segment metrics associated therewith; identify a traffic bottleneck by aggregating a plurality of adjacent road segments having a traffic disruption therealong and the one or more road segment metrics associated therewith; and rank each traffic bottleneck based on one or more aggregated road segment metrics associated therewith.

According to an embodiment, the road network is defined by a plurality of nodes interconnected by one or more edges, each node representing a road segment intersection and having a unique node ID associated therewith, and each edge representing at least a portion of one of the plurality of road segments.

According to an embodiment, the identifying of the traffic bottleneck comprises operating the at least one processor to: identify each node of the plurality of nodes that is interconnected with one or more edges having a traffic disruption therealong; generate an undirected graph comprising the one or more edges having a traffic disruption therealong and each node interconnected therewith; and generate a compressed undirected graph comprising an aggregated node having associated therewith the one or more aggregated road segment metrics based on the one or more road segment metrics associated with each road segment represented by the one or more edges having a traffic disruption therealong.

According to an embodiment, the generating of the compressed undirected graph comprises operating the at least one processor to: for each node of the undirected graph, modify the node ID associated therewith to that of a minimum adjacent node ID, if present; merge nodes having identical node IDs to generate one or more merged nodes, each of the one or more merged nodes having associated therewith the one or more road segment metrics associated with each road segment represented by each edge interconnecting the nodes prior to merging; and repeat the modifying of the node IDs and the merging of the nodes having the identical node IDs until the compressed undirected graph comprising the aggregated node is generated.

According to an embodiment, the generating of the undirected graph comprises operating the at least one processor to interconnect proximate nodes between which at least a portion of a road segment is present by adding an omitted edge therealong.

According to an embodiment, the one or more road segment metrics comprise a speed metric, a travel time metric, a dimension metric, a direction metric, a load metric, a traffic disruption metric, or a combination thereof.

According to an embodiment, the traffic disruption metric comprises a weight-based temporal delay cost.

According to an embodiment, the one or more aggregated road segment metrics comprise an aggregated travel time metric, an aggregated speed metric, an aggregated direction metric, an aggregated load metric, an aggregated traffic disruption metric, an aggregated dimension metric, an aggregated travel time metric, a travel time index (III), a buffer time index (BTI), a planning time index (PTI), a reliability cost, a bottleneck concentration, or a combination thereof.

According to an embodiment, the ranking of each traffic bottleneck based on the one or more aggregated road segment metrics comprises operating the at least one processor to rank each traffic bottleneck based on the one or more aggregated road segment metrics using a utility function.

According to an embodiment, the ranking of each traffic bottleneck comprises operating at least one processor to rank each traffic bottleneck based on a utility function that uses at least the one or more aggregated road segment metrics as factors thereof.

According to an embodiment, the utility function uses, in addition to the one or more aggregated road segment metrics, one or more social costs as a factor thereof.

According to an embodiment, the ranking of each traffic bottleneck comprises operating at least one processor to rank each traffic bottleneck based on a utility function that uses, as a factor thereof, one or more economic costs based on the one or more aggregated road segment metrics, and, optionally, one or more social costs.

According to an embodiment, the one or more social costs comprise a volume of greenhouse gas emissions, a unit economic loss for delay, a unit social cost for emission of greenhouse gas, a predicted market share in terms of greenhouse gas emissions, or a combination thereof.

According to an embodiment, the traffic data comprises speed limit data associated with at least one of the plurality of road segments.

According to an embodiment, the traffic data comprises vehicle speed data collected from a plurality of vehicles operating within the road network over a period of time.

According to an embodiment, the period of time is at least a month.

According to an embodiment, the benchmark speed is determined based on a road segment speed limit and/or a maximum collected road segment vehicle speed.

According to an embodiment, the benchmark speed is a minimum of the road segment speed limit and the maximum collected road segment vehicle speed.

According to an embodiment, the maximum collected road segment vehicle speed is a maximum of an 85th percentile collected road segment vehicle speed.

According to an embodiment, the determining of the presence of the traffic disruption comprises operating the at least one processor to determine, for each of the plurality of road segments, whether a collected road segment vehicle speed is less than the benchmark speed.

According to an embodiment, the plurality of vehicles from which the vehicle speed data is collected are freight transport vehicles.

In another aspect, the present disclosure relates to a non-transitory computer readable medium having instructions stored thereon executable by at least one processor to implement the methods described herein.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

FIG. 6A shows an example of an undirected graph representing a portion of a road network according to an embodiment of the present disclosure, the undirected graph comprising nodes interconnected by edges determined to have traffic disruptions therealong.

FIG. 6B shows the modification of the node IDs of the undirected graph of FIG. 6A to the minimum adjacent node IDs according to an embodiment of the present disclosure.

FIG. 6C shows a partially compressed undirected graph based on the undirected graph shown in FIG. 6A and FIG. 6B according to an embodiment of the present disclosure.

FIG. 6D shows a compressed undirected graph comprising an aggregated node according to an embodiment of the present disclosure.

DETAILED DESCRIPTION

Figure 1:
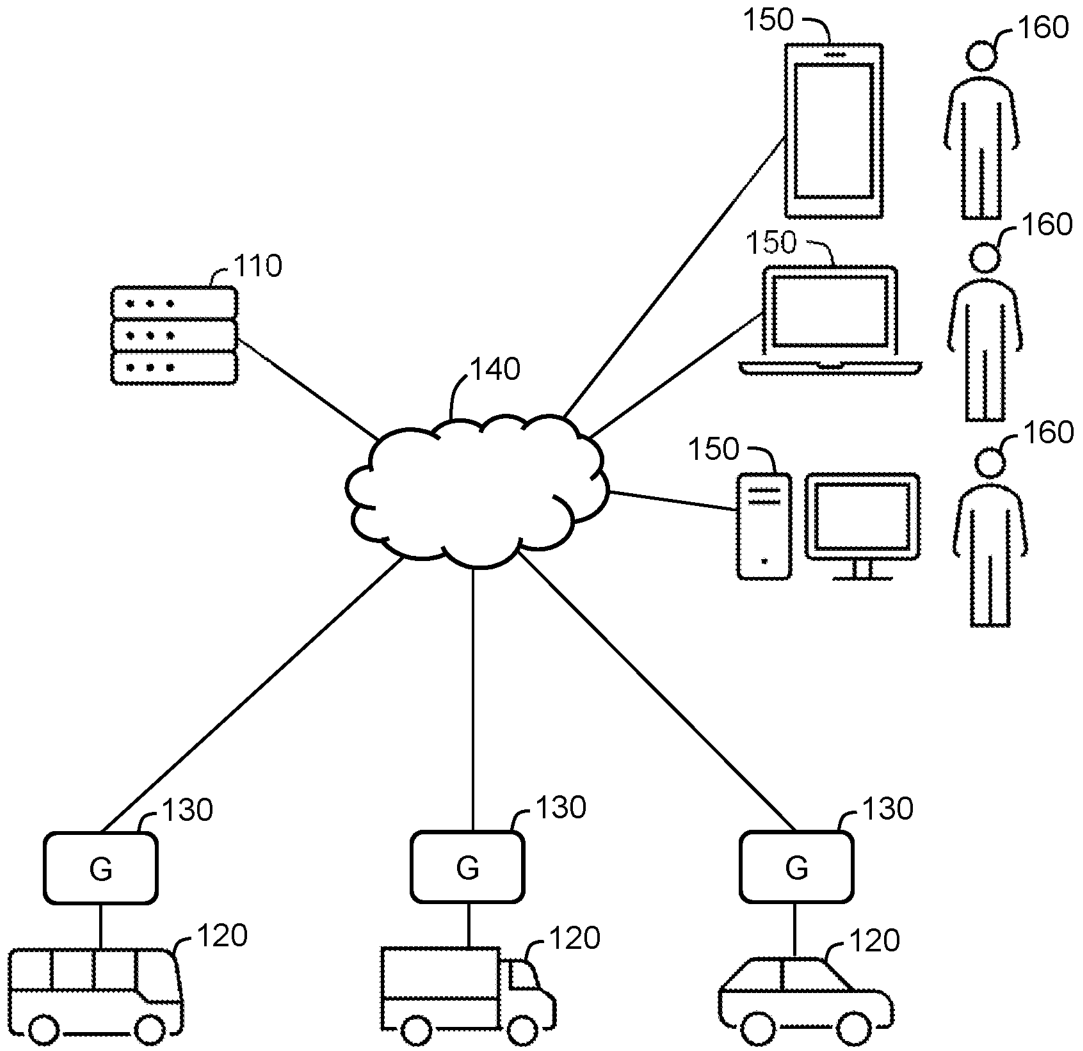
FIG. 1 is a block diagram of various components interacting with an example fleet management system and a plurality of example telematic devices according to an embodiment of the present disclosure.

Conventional methods for identifying and ranking traffic bottlenecks have a number of shortcomings. For example, as described herein, conventional methods may be limited to small-scale applications. In more detail, conventional methods may only consider short-term recurrent and non-recurrent traffic disruptions in relatively small geographical areas. As will be appreciated, considering only relatively small geographical locations in analyses may not be particularly useful for industries such as freight transport that operate fleets of vehicles across a wide geographical area, such as highways across the US or Canada.

Further, conventional methods may rely on metrics such as vehicle speed or hourly volume to identify and rank traffic bottlenecks. While such metrics may be useful for providing information to users during personal travel, they are not particularly useful for commercial operations, as they may not be useful for providing, for example, an accurate representation or prediction of costs associated with delays incurred by the traffic bottlenecks.

Furthermore, conventional methods for identifying and ranking traffic bottlenecks may also be limited in the type of infrastructure considered in the analyses thereof. For example, conventional methods may typically only consider specific portions (i.e., relatively small geographical areas) of major roadways such as highways. However, considering only major roadways may neglect traffic bottlenecks present in more-complex road networks such as those within cities that are also used by a variety of industries (e.g., freight transport, maintenance services, etc.).

Thus, it is an object of the present disclosure to provide advantageous systems and methods for identifying and ranking traffic bottlenecks. For example, in an embodiment, the methods and systems of the present invention may be capable of identifying traffic bottlenecks across an entire road network, thereby providing large-scale traffic bottleneck identification. As will be appreciated, large-scale traffic bottleneck identification may be particularly useful for businesses such as freight transport companies that operate across a wide geographical area.

Further, the methods and systems of the present disclosure may use metrics that are useful for commercial applications when identifying and/or ranking traffic bottlenecks. For example, in an embodiment, the methods and systems of the present disclosure may involve the determining of metrics relating to road segments of a traffic bottleneck that may be useful for determining aggregated metrics such as, but not limited to, economic costs (e.g., temporal delay costs), social costs (e.g., greenhouse gas emissions), or a combination thereof that may, in turn, be used in the identification and/or ranking of traffic bottlenecks. Such metrics may be useful for commercial users, as they may be more indicative of the impacts traffic bottlenecks may have on business operations (e.g., transporting freight) than those typically used by conventional techniques.

Furthermore, the methods and systems of the present disclosure may identify traffic bottlenecks using long-term analyses. For example, in an embodiment, traffic bottlenecks may be identified using traffic data collected during an extended temporal cycle (e.g., monthly, yearly, etc.). As will be appreciated, the use of information collected from an extended temporal cycle may be useful to commercial users for applications such as route-planning and/or optimization.

Additional advantages will be discussed below and will be readily apparent to those of ordinary skill in the art upon reading the present disclosure.

Reference will now be made in detail to example embodiments of the disclosure, wherein numerals refer to like components, examples of which are illustrated in the accompanying drawings that further show example embodiments, without limitation.

Referring now to FIG. 1, there is shown an example of a fleet management system 110 for managing a plurality of vehicles 120 equipped with a plurality of telematics devices 130. Each of the telematics devices 130 is capable of collecting various vehicle data from the vehicles 120 and sharing the vehicle data with the fleet management system 110. The fleet management system 110 may be remotely located from the telematics devices 130 and the vehicles 120.

As will be appreciated, the vehicles 120 may include any type of vehicle. For example, the vehicles 120 may include motor vehicles such as cars, trucks (e.g., pickup trucks, heavy-duty trucks such as class-8 vehicles, etc.), motorcycles, industrial vehicles (e.g., buses), and the like. Each motor vehicle may be a gas, diesel, electric, hybrid, and/or alternative fuel vehicle. Each of the vehicles 120 may be equipped with one of the telematics devices 130. Of course, it will be appreciated that the systems and methods of the present disclosure may be particularly useful for commercial or industrial applications. Thus, in some embodiments, the vehicles 120 may be commercial vehicles such as freight transport vehicles.

Further, it is noted that, while only three vehicles 120 having three telematics devices 130 are shown in the illustrated example, it will be appreciated that there may be any number of vehicles 120 and telematics devices 130. For example, the fleet management system 110 may manage hundreds, thousands, or even millions of vehicles 120 and telematics devices 130.

In some embodiments, the telematics devices 130 may be standalone devices that are removably installed in the vehicles 120 (e.g., aftermarket telematics devices). In other embodiments, the telematics devices 130 may be integrated components of the vehicles 120 (e.g., pre-installed by an OEM). The telematics devices 130 may collect various vehicle data and share the vehicle data with the fleet management system 110. As discussed herein, the vehicle data may include any information, parameters, attributes, characteristics, and/or features associated with the vehicles 120. For example, the vehicle data may include, but is not limited to, location data, speed data, acceleration data, fluid level data (e.g., oil, coolant, and washer fluid), energy data (e.g., battery and/or fluid level), or a combination thereof. Regardless, it should be appreciated the vehicle data is a form of electronic data that requires a computer (e.g., a processor such as those described herein) to transmit, receive, interpret, process, and/or store.

Once received, the fleet management system 110 may process the vehicle data collected from the telematics devices 130 to provide various analysis and reporting. In some embodiments, the fleet management system 110 may process the vehicle data to provide additional information about the vehicles 120 such as trip distances and times, idling times, harsh braking and driving, usage rates, fuel economy, etc. The fleet management system 110 may also process other types of data with the vehicle data, such as map data provided by external map information providers.

A plurality of computing devices 150 may provide access to the fleet management system 110 to a plurality of users 160. The users 160 may use computing devices 150 to access or retrieve various vehicle data collected and/or process by the fleet management system 110. As will be appreciated, the computing devices 150 may be any suitable computing devices. For example, the computing devices 150 may be personal computers, portable computers, wearable computers, workstations, desktops, laptops, smartphones, tablets, smartwatches, personal digital assistants (PDAs), mobile devices, or the like. The computing devices 150 may be remotely located from the fleet management system 110, telematic devices 130, and vehicles 120.

The fleet management system 110, telematics devices 130, and computing devices 150 may communicate through a network 140. The network 140 may comprise a plurality of networks and may be wireless, wired, or a combination thereof. As will be appreciated, the network 140 may employ any suitable communication protocol and may use any suitable communication medium. For example, the network 140 may comprise Wi-Fi™ networks, Ethernet networks, Bluetooth™ networks, near-field communication (NFC) networks, radio networks, cellular networks, and/or satellite networks. The network 140 may be public, private, or a combination thereof. For example, the network 140 may comprise local area networks (LANs), wide area networks (WANs), the internet, or a combination thereof. Of course, as will also be appreciated, the network 140 may also facilitate communication with other devices and/or systems that are not shown.

Figure 2:
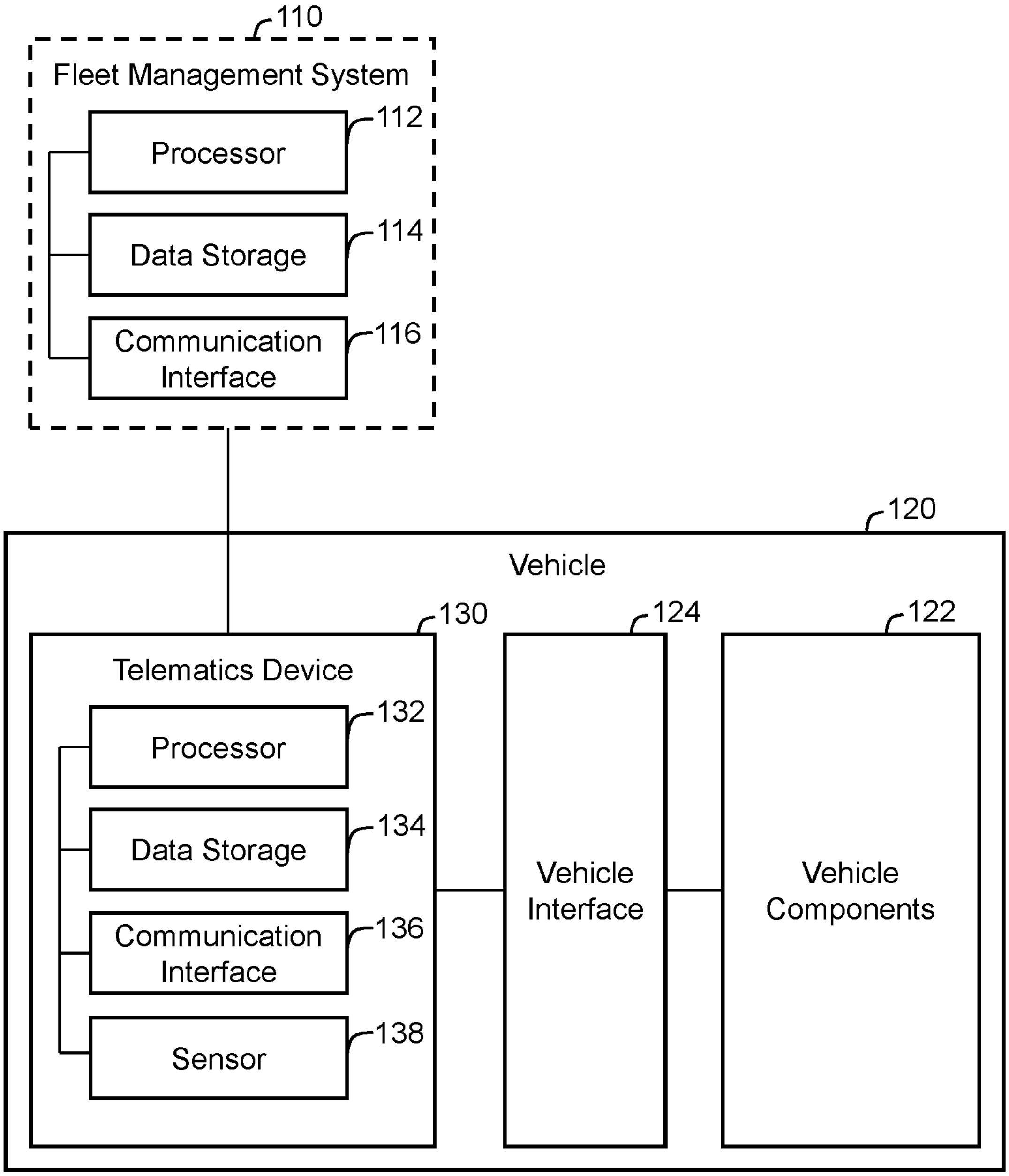
FIG. 2 is a block diagram of the fleet management system shown in FIG. 1 interacting with one of the telematics devices and vehicles shown in FIG. 1 according to an embodiment of the present disclosure.

Referring now to FIG. 2, there is illustrated the fleet management system 110 in communication with one of the telematics devices 130 that is installed in one of the vehicles 120. As shown, the fleet management system 110 may include a processor 112, a data storage 114, and a communication interface 116, each of which may communicate with each other. The processor 112, the data storage 114, and the communication interface 116 may be combined into fewer components, divided into additional subcomponents, or a combination thereof. The components and/or subcomponents may not necessarily be distributed in proximity to one another and may instead be distributed across a wide geographical area. In some embodiments, the fleet management system 110 may be implemented using a cloud computing system.

The processor 112 may control the operation of the fleet management system 110. As will be appreciated, the processor 112 may be implemented using one or more suitable processing devices. For example, the processor 112 may be implemented using central processing units (CPUs), graphics processing units (GPUs), field programmable gate arrays (FPGAs), application specific integrated circuits (ASICs), digital signal processors (DSPs), neural processing units (NPUs), quantum processing units (QPUs), microprocessors, controllers, and the like. The processor 112 may execute various instructions, programs, software, or a combination thereof stored on the data storage 114 to implement various methods described herein. For example, the processor 112 may process various vehicle data (e.g., vehicle speed data) collected by the fleet management system 110 from the telematics devices 130 and/or other data received from additional external sources, such as map data received from one or more map information providers.

Various data for the fleet management system 110 may be stored on the data storage 114. The data storage 114 may be implemented using one or more suitable data storage devices or systems such as random-access memory (RAM), read only memory (ROM), flash memory, hard disk drives (HDDs), solid-state drives (SSDs), magnetic tape drives, optical disc drives, memory cards, and the like. The data storage 114 may include volatile memory, non-volatile memory, or a combination thereof. Further, the data storage 114 may comprise non-transitory computer readable media. The data storage 114 may store various instructions, programs, and/or software that are executable by the processor 112 to implement various methods described herein. The data storage 114 may store various vehicle data (e.g., vehicle speed data) collected from the telematics devices 130 and/or processed by the processor 112 and/or other data received from additional external sources, such as such as map data received from one or more map information providers.

The communication interface 116 may enable communication between the fleet management system 110 and other devices and/or systems, such as the telematics devices 130. The communication interface 116 may be implemented using any suitable communications devices and/or systems. For example, the communication interface 116 may comprise one or more various physical connectors, ports, or terminals such as universal serial bus (USB), ethernet, Thunderbolt, Firewire, serial advanced technology attachment (SATA), peripheral component interconnect (PCI), high-definition multimedia interface (HDMI), DisplayPort, and the like. As another example, the communication interface 116 may comprise one or more wireless interface components to connect to wireless networks such as Wi-Fi™, Bluetooth™, NFC, cellular, satellite, and the like. The communication interface 116 may enable various inputs and outputs to be received at and sent from the fleet management system 110. For example, the communication interface 116 may be used to retrieve vehicle data from the telematics devices 130.

The telematics devices 130 may include a processor 134, a data storage 134, and a communication interface 136. The telematics devices 130 may also comprise a sensor 138. Each of the components of the telematics devices 130 may communicate with each other and may be combined into fewer components or divided into additional subcomponents.

The processor 132 may control the operation of the telematics device 130. The processor 132 may be implemented using any suitable processing devices or systems, such as those described above in relation to the processor 112 of the fleet management system 110. The processor 132 may execute various instructions, programs, software, or a combination thereof stored on the data storage 134 to implement various methods described herein. For example, the processor 132 may process various vehicle data collected from vehicle components 122 and/or the sensor 138 (e.g., vehicle speed data).

The data storage 134 may store various data for the telematics device 130. The data storage 134 may be any suitable data storage device or system, such as those described above in relation to the data storage 114 of the fleet management system 110. The data storage 134 may store various instructions, programs, software, or a combination thereof executable by the processor 132 to implement various methods described herein. As well, the data storage 134 may store various vehicle data collected from the vehicle components 122 and/or the sensor 138 (e.g., vehicle speed data), as well as other data received from additional external sources, such as such as map data received from one or more map information providers.

The communication interface 136 may enable communication between the telematics devices 130 and other devices or systems, such as the fleet management system 110 and the vehicle components 122. The communication interface 136 may comprise any suitable communication devices or systems, such as those described above in relation to the communication interface 116 of the fleet management system 110. The communication interface 136 may enable various inputs and outputs to be received at and sent from the telematics devices 130. For example, the communication interface 136 may be used to collect vehicle data from the vehicle components 122 and/or sensor 138, to send vehicle data (e.g., vehicle speed data) to the fleet management system 110, etc.

The sensor 138 may detect and/or measure various environmental events, changes, etc. The sensor 138 may comprise any suitable sensing devices or systems, such as, but not limited to, location sensors, velocity sensors, acceleration sensors, orientation sensors, vibration sensors, proximity sensors, temperature sensors, humidity sensors, pressure sensors, optical sensors, audio sensors, and combinations thereof. When the telematics device 130 is installed in the vehicle 120, the sensor 138 may be used to collect vehicle data that may not be obtainable from the vehicle components 122. For example, the sensor 138 may include a satellite navigation device such as a global positioning system (GPS) receiver that may measure the location of the vehicle 120. In some embodiments, the sensor 138 may comprise accelerometers, gyroscopes, magnetometers, inertial measurement units (IMUs), or the like that may measure the acceleration and/or orientation of the vehicle 120.

The telematics device 130 may be installed within the vehicle 120 removably or integrally. The vehicle 120 may include the vehicle components 122 and a vehicle interface 124, which, as will be appreciated, may be combined into fewer components or divided into additional subcomponents. In some embodiments, the vehicle components 122 may comprise any subsystems, parts, subcomponents, or combinations thereof of the vehicle 120. For example, the vehicle components 122 may comprise powertrains, engines, transmissions, steering, braking, seating, batteries, doors, suspensions, etc. The telematics device 130 may collect vehicle data from the vehicle components 122. For example, in some embodiments, the telematics device 130 may communicate with one or more electrical control units (ECUs) that control the vehicle components 122 or one or more internal sensors thereof.

The vehicle interface 124 may facilitate communication between the vehicle components 122 and other devices or systems. As well, the vehicle interface 124 may comprise any suitable communication devices or systems. For example, the vehicle interface 124 may comprise an OBD-II port and/or CAN bus port. The vehicle interface 124 may be used by the telematics device 130 to collect vehicle data from the vehicle components 122. For example, the communication interface 136 may be connected to the vehicle interface 124 to communicate with the vehicle components 122.

Figure 3:
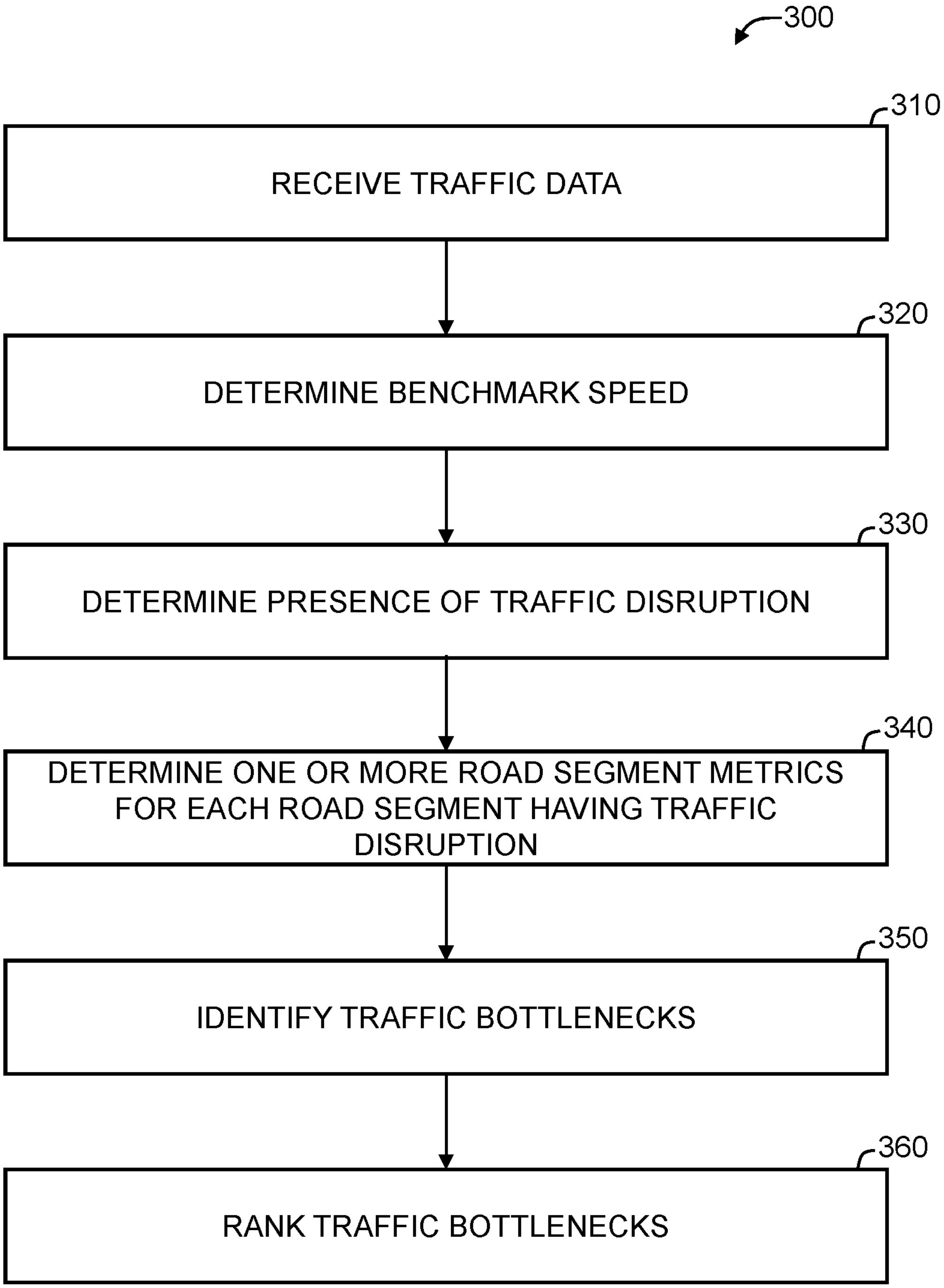
FIG. 3 is a flowchart of an example method for identifying and ranking traffic bottlenecks according to an embodiment of the present disclosure.

Referring now to FIG. 3, there is shown an example method 300 for identifying and ranking traffic bottlenecks according to the present disclosure. As shown, the method 300 may comprise operating at least one processor to: receive traffic data associated with a road network comprising a plurality of road segments, the traffic data comprising vehicle speed data collected from a plurality of vehicles operating within the road network (310); determine a benchmark speed for each of the plurality of road segments (320); determine, for each of the plurality of road segments, whether a traffic disruption is present by comparing the benchmark speed thereof to vehicle speed data collected from at least one vehicle operating therealong (330); determine, for each of the plurality of road segments along which a traffic disruption is present, one or more road segment metrics associated therewith (340); identify a traffic bottleneck by aggregating a plurality of adjacent road segments having a traffic disruption therealong and the one or more road segment metrics associated therewith (350); and rank each traffic bottleneck based on one or more aggregated road segment metrics associated therewith (360).

As will be appreciated, the method 300 may be implemented using any suitable hardware systems and devices such as those illustrated in FIG. 1 and FIG. 2. For example, the method 300 may be implemented by the fleet management system 110 and the telematics devices 130. In more detail, the method 300 may be implemented by operating at least one processor of the fleet management system 110 such as the processor 112 to execute instructions stored on the data storage 114. However, as will be appreciated, due to the nature, as well as the large volumes, of data to be processed, the systems and methods of the present disclosure generally require implementation via one or more computers (e.g., one or more of the processors 112, 132).

As shown in FIG. 3 at 310, traffic data may be received. The traffic data is associated with a road network comprising a plurality of segments. That is, the traffic data may include map data that defines a road network within a geographical area. The map data may be obtained from, for example, various map information providers such as OpenStreetMap (OSM).

A road network generally comprises a plurality of road segments. The road segments define the road network and may represent any type of roadway along which a vehicle may travel, including, but not limited to, roads, streets, avenues, alleyways, highways, freeways, etc. The road network may be any size—i.e., may include any number of road segments. As well, the road network may, in some embodiments be a portion of a larger road network or include one or more smaller road networks as portions thereof.

In some embodiments, the traffic data may comprise speed limit data associated with at least one of the plurality of road segments of the road network. The speed limit data may represent the speed limits imposed on road segments by a regulatory body of a geographical region. As will be appreciated, the speed limit data may also be obtained from map data providers such as OSM, received from users of the systems and methods of the present disclosure, etc.

The traffic data also includes vehicle speed data collected from a plurality of vehicles (e.g., the vehicles 120) operating within the road network. That is, vehicle speed data may be collected from a plurality of vehicles operating along one or more of the road segments of the road network via, for example, the telematics device 130 installed therein. The vehicle speed data may therefore represent the velocity, or rate of locational change, of each of the plurality of vehicles operating within the road network (or along one or more the road segments of the road network). The vehicle speed data may be collected, for example, from the vehicle components 122 (e.g., a vehicle speed sensor or "VSS" located in the powertrain and/or ABS of the vehicle), calculated based on changes in location data over time (e.g., obtained by the sensor 138), or a combination thereof. The vehicle speed data may be obtained by the telematics devices 130 (e.g., from the vehicle components 122 and/or the sensor 138, and received by the processor 132). Alternatively, or additionally, the vehicle speed data may be received by the fleet management system 110 (e.g., the processor 112) from the telematics devices 130. Alternatively, or additionally, the processor 112 and/or the processor 132 may receive vehicle data from the data storage 114 and/or the data storage 134.

In some embodiments, the vehicle speed data may be collected from a plurality of vehicles operating within the road network over the course of a particular period of time (e.g., by a plurality of the telematics device 130 installed therein). For example, the vehicle speed data may include the speeds of vehicles operating within the road network over the course of a week, a month, half a year, a year, etc. In such embodiments, the vehicle speed data may be processed (e.g., aggregated, averaged, etc.) to facilitate the identifying and ranking of traffic bottlenecks, as will be described herein. For example, in an embodiment, the vehicle speed data collected from vehicles operating along a particular road segment may be averaged to provide a mean vehicle speed along the road segment.

Further, in some embodiments, the vehicle speed data may be collected from a plurality of vehicles operating within the road network during a particular time of day, week, month, etc. over the course of a particular period of time. For example, in such embodiments, the vehicle speed data may include the speeds of vehicles operating within the road network during "rush hour" times (i.e., when the road network may be busy due to commuter activity), during weekdays and weekends, etc. The vehicle speed data may therefore be used to characterize road segments of a road network at particular times of the day, week, month etc., and over a particular period of time, for use in downstream operations.

As shown at 320 of FIG. 3, a benchmark speed for each of the plurality of road segments may be determined. A benchmark speed may represent a typical or expected speed of a vehicle operating along a particular road segment. The benchmark speed may be determined using various techniques. For example, a road segment speed limit may be selected as a benchmark speed for that road segment.

However, as will be appreciated, speed limit data may not be available for every road segment (e.g., road segments of road networks located in rural areas). In such cases, a benchmark speed of a road segment may be based on the speeds of vehicles operating therealong. For example, as described herein, vehicle speed data obtained from vehicles operating along the road segment may be averaged, aggregated, or the like to provide the benchmark speed. In some embodiments, the benchmark speed of a road segment may be based on vehicle speed data obtained from vehicles operating along the road segment during a particular time of the day, week, month, etc. and/or over a period of time. For example, the benchmark speed of a road segment may be based on vehicle speed data obtained from vehicles operating along the road segment during a selected day, month, year, etc. As another non-limiting example, the benchmark speed of a road segment may be based on vehicle speed data obtained from vehicles operating along the road segment during weekdays, over the course of a year.

In some embodiments, the benchmark speed may be based on a maximum collected road segment vehicle speed. That is, the benchmark speed may correspond to a maximum vehicle speed collected from a vehicle operating along the road segment (e.g., using the vehicle speed data as described above). However, it may be the case that the maximum collected road segment vehicle speed may have been collected from a vehicle that was operating abnormally fast along the road segment. As will be appreciated, abnormal speeds may not be particularly useful for determining a benchmark speed. In such cases, it may be useful to select a maximum collected road segment vehicle speed based on percentiles of the vehicle speeds collected from vehicles operating along the road segment. For example, in some embodiments, the maximum collected road segment vehicle speed may be a maximum of an $85^{th}$ percentile collected road segment vehicle speed. Of course, other percentiles may be used and are contemplated.

In some cases, speed limit data and vehicle speed data may be available for a particular road segment. In such cases, it may be useful to consider both types of data when determining a benchmark speed for the road segment. For example, in some embodiments, the benchmark speed for a road segment may be determined by selecting the minimum of the road segment speed limit and the maximum collected road segment vehicle speed (e.g., a maximum of an $85^{th}$ percentile collected road segment vehicle speed). As will be described herein, selecting a minimum of the road segment speed limit and the maximum collected road segment vehicle speed may be useful when determining whether a traffic disruption is present along the road segment. As another example, in some embodiments, the benchmark speed for a road segment may be determined by selecting the minimum of the road segment speed limit and the averaged and/or the aggregated (e.g., by way of majority vote) road segment vehicle speed.

As shown in FIG. 3, at 330, the presence of a traffic disruption may be determined. In more detail, for each road segment having a benchmark speed associated therewith, the presence of a traffic disruption may be determined by comparing the benchmark speed to vehicle speed data obtained from at least one vehicle operating along that road segment (e.g., by the telematics device 130). In some embodiments, a traffic disruption may be identified by determining whether a collected road segment vehicle speed is less than the benchmark speed. That is, if vehicle speed data collected from a vehicle operating along a particular road segment is less than the benchmark speed of that road segment, it may indicate that there is a traffic disruption along that road segment that is causing the vehicle to operate at a slower speed.

As described above, the presence of a traffic disruption along a road segment may be determined using vehicle speed data collected from at least one vehicle operating along the road segment. However, it may be the case that a plurality of vehicles are operating or have operated along the road segment. In such cases, the vehicle speed data collected from each of the vehicles may be used to determine the presence of a traffic disruption. For example, the vehicle speed data collected from each of the vehicles may be averaged and/or aggregated to provide a mean collected road segment vehicle speed that may be compared to the benchmark speed of the road segment to determine whether a traffic disruption is present.

As also described above, in some embodiments, the vehicle speed data may be collected from a plurality of vehicles operating within the traffic network during a particular time of the day, week, month, etc. and/or over an extended period of time (e.g., at least a month). In such embodiments, historical vehicle speed data may be used to determine metrics such as average vehicle speed along a certain road segment over the course of a selected period of time. Such metrics may be useful in determining whether the traffic disruption is expected (e.g., often present due to factors such as infrastructure design, extended construction projects, busy intersections, etc.) or unexpected (e.g., caused by a vehicle collision, unexpected infrastructure damage such as that caused by a weather event, etc.).

Further, in some embodiments, the determining of the traffic disruption may comprise determining a traffic disruption classification of a road segment. In such embodiments, the traffic disruption classification may represent the apparent severity of the traffic disruption. For example, in an embodiment, the determining of the traffic disruption classification of the road segment may be based on the vehicle speed data as a percentage of the benchmark speed of the road segment. For instance, a road segment having vehicle speed data that is greater than 80% of the benchmark speed may be classified as a "lack of traffic disruption", a road segment having vehicle speed data that is greater than 70% and less than or equal to 80% of the benchmark speed may be classified as a "low traffic disruption", a road segment vehicle speed data that is greater than 50% and less than or equal to 70% of the benchmark speed may be classified as a "minor traffic disruption", a road segment having vehicle speed data that is greater than 20% and less than or equal to 50% of the benchmark speed may be classified as a "significant traffic disruption", and a road segment having vehicle speed data that is less than or equal to 20% of the benchmark speed may be classified as a "severe traffic disruption". Such classifications may be used, for example, to determine whether certain traffic disruptions may or may not be included in downstream operations described herein (e.g., as selected by a user).

At 340 of FIG. 3, it is shown that one or more road segment metrics associated with each of the plurality of road segments along which a traffic disruption is present may be determined. The one or more road segment metrics to be determined may be any metric, parameter, or the like relating to the road segment, the vehicles operating therealong, and/or a traffic disruption present therealong. As will be described herein, the one or more road segment metrics may be used to identify and rank traffic bottlenecks.

In some embodiments, the one or more road segment metrics may include metrics such as, but not limited to, speed metrics, travel time metrics, dimension metrics, direction metrics, load metrics, traffic disruption metrics, and the like. In more detail, speed metrics may include metrics relating to the speed of vehicles operating along the road segment (e.g., average speed, standard deviation of speed, median speed, percentiles of speeds, highest speeds, etc.); travel time metrics may include metrics relating to the time it takes for a vehicle to traverse the road segment (e.g., average travel time, median travel time, percentiles of travel times, etc.); dimension metrics may include metrics relating to the dimensions of the road segment (e.g., a length of the road segment); direction metrics may include metrics relating to the direction that vehicles travel along the road segment; load metrics may include metrics relating to the total maximum load capacity of the road segment; and traffic disruption metrics may include metrics relating to the impacts of the traffic disruption along the road segment (e.g., economic impacts such as temporal delay costs).

For further illustration, one example of a traffic disruption metric that may be useful for identifying and ranking traffic bottlenecks is a temporal delay cost, which may represent a cost associated with a delay incurred due to the traffic disruption. Temporal delay costs may be determined using a number of techniques, and may vary, for example, based on the particular needs of a user. However, the inventors of the present disclosure found that conventional techniques for determining temporal delay costs may not capture the difference in payload capacity among different vehicles (e.g., passenger vehicles, different classes of trucks, etc.) and, as a result, may not be particularly accurate for certain industries such as those that transport freight. Instead, the inventors of the present disclosure found that it may be useful to use a weight-based temporal delay cost as a traffic disruption metric, which may be determined as shown in the below equation:

$$\text{temporal delay cost} = \text{extra travel time} \times \text{maximum total weight}$$

In the above equation, the "maximum total weight" may represent the maximum carrying weight of the vehicle (e.g., freight transport vehicle). The maximum carrying weight of the vehicle may be based on, for example, the classification of the vehicle (e.g., the maximum carrying weight of a class-8 vehicle) and/or a manufacturer-suggested maximum carrying weight. However, it is noted that, for other vehicles (e.g., passenger vehicles), the maximum total weight may represent, for example, the maximum number of passengers that a vehicle may carry.

Of course, if the weight of the freight or goods being transported by a vehicle is known, that information may be used to determine the weight-based temporal delay cost, as shown in the below equation:

$$\text{temporal delay cost} = \text{extra travel time} \times \text{weight of goods}$$

In the above equation, the "weight of goods" may represent the weight of the freight being transported by the vehicle. However, such metrics may not be particularly applicable for all types of vehicles (e.g., passenger vehicles). Thus, in situations where the vehicle is not transporting freight, the "weight of goods" may instead refer to, for example, the number of passengers present therein.

Further, it is noted that, in the above equations, the "extra travel time" may represent the additional time a vehicle spends operating along a road segment due to a traffic disruption. The extra travel time may be determined by comparing the time it takes a vehicle to operate along a road segment to an expected travel time based on a benchmark speed associated therewith. For example, extra travel time may be determined using an equation such as that included below, wherein the average travel time represents an average measured travel time of a vehicle to travel along a full length of the road segment:

$$\text{extra travel time} = \frac{\text{road segment length}}{\text{road segment speed limit}} - \text{average travel time}$$

As will appreciated, it may in some cases be useful to determine the extra travel time using an equation such as that included below:

$$\text{extra travel time} = \text{average travel time} - \frac{\text{road segment length}}{\text{road segment speed limit}}$$

The above-described weight-based temporal delay cost may therefore account for the carrying capacity of vehicles affected by a traffic disruption and, as a result, may be useful for certain industries such as freight transport.

As shown at 350 of FIG. 3, a traffic bottleneck may be identified by aggregating a plurality of adjacent road segments having a traffic disruption therealong and the one or more road segment metrics associated therewith. As will be appreciated, a single identified traffic disruption may not necessarily indicate a traffic bottleneck. In contrast, a plurality of adjacent traffic disruptions (i.e., adjacent road segments having a traffic disruption therealong), may more accurately indicate the presence of a traffic bottleneck. Thus, a traffic bottleneck may include a plurality of adjacent road segments (i.e., aggregated adjacent road segments) that each have a traffic disruption therealong and may be associated with the one or more road segment metrics associated with each of the plurality of adjacent road segments.

In more detail, plurality of adjacent road segments having a traffic disruption therealong and the one or more road segment metrics associated therewith may be aggregated using various techniques. For example, in some embodiments, the road network with which the traffic data is associated may comprise a plurality of road segments that are defined by a plurality of nodes interconnected by one or more edges. In such embodiments, the nodes may represent points long a road segment at which a decision may be made (e.g., an intersection of road segments) while the edges may represent at least a portion of a road segment (e.g., the shape, the length, direction of traffic, etc.) between such points.

Figure 4:
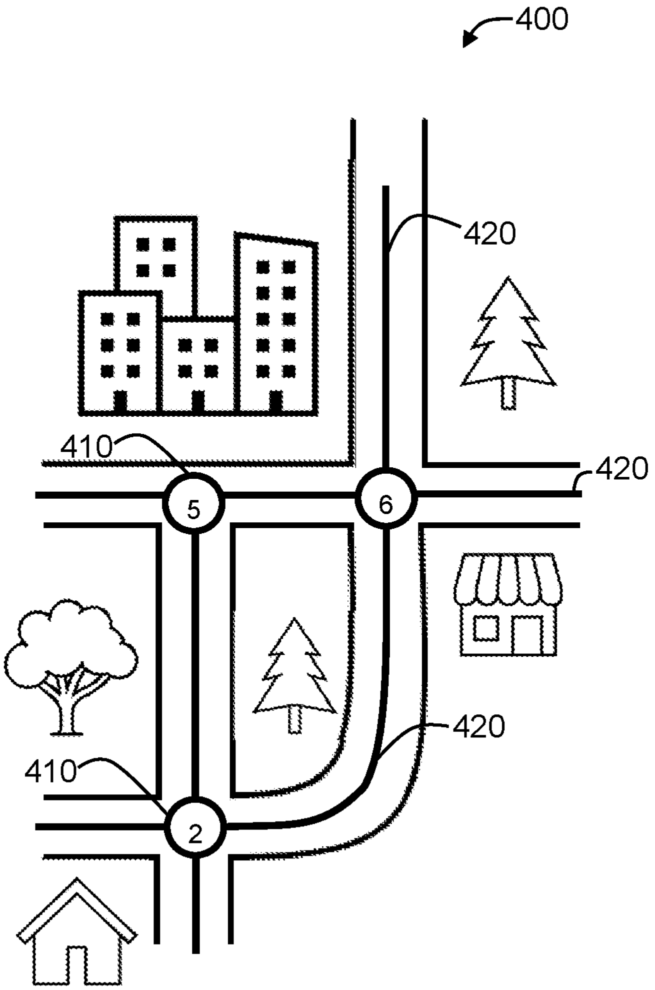
FIG. 4 is a simplified depiction of a road network defined by a series of nodes and edges according to an embodiment of the present disclosure.

An example of a road network 400 defined by a plurality of nodes 410 and a plurality of edges 420 is illustrated in FIG. 4. As shown, the plurality of nodes 410 each correspond to an intersection of road segments and are interconnected by the plurality of edges 420, each of which represents at least a portion of a road segment, to define the road network 400. As will be appreciated, map information providers (e.g., OSM) may provide map data in such formats. Alternatively, the traffic data may be processed (e.g., by the processor 112 and/or the processor 132) to associate nodes and edges with the road network after the receipt thereof. As is also shown in FIG. 4, each of the nodes may have associated therewith a unique node ID, represented by the numerical value contained therein. The unique node ID may be used to identify a node within a given road network or geographical area and may be generated by the map information provider or assigned after receipt of the traffic data.

Figure 5:
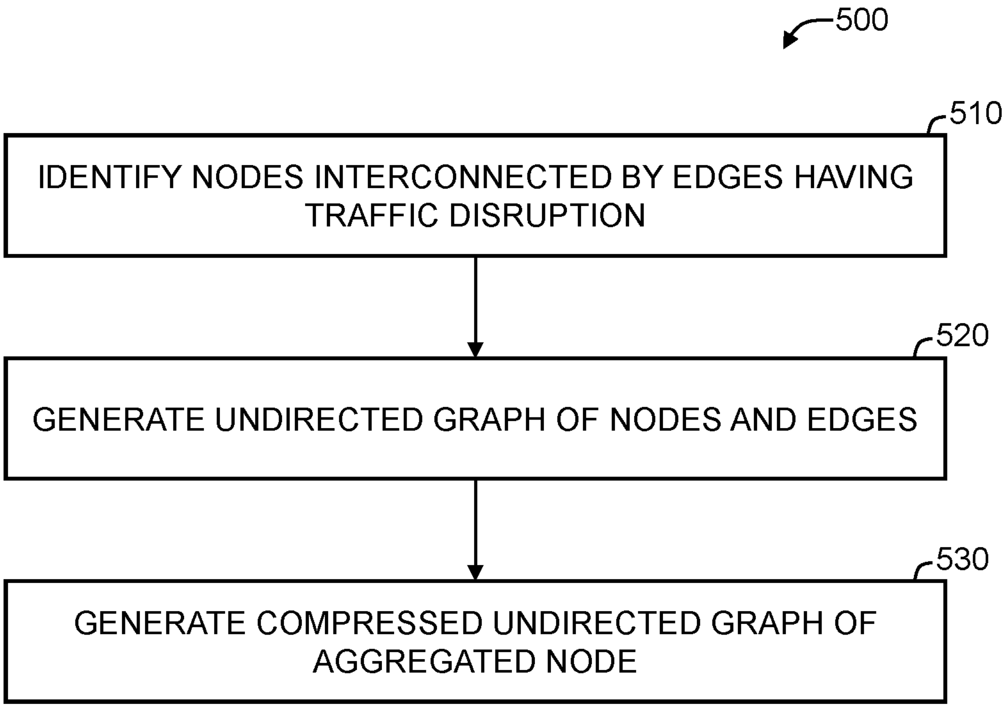
FIG. 5 is a flowchart of an example method for aggregating adjacent road segments having traffic disruptions therealong to identify a traffic bottleneck according to an embodiment of the present disclosure.

The nodes and edges may be used to aggregate the plurality of adjacent road segments having a traffic disruptions therealong and the one or more road segment metrics associated therewith using, for example, the method illustrated in FIG. 5, wherein identifying a traffic bottleneck by aggregating a plurality of adjacent road segments having a traffic disruptions therealong and the one or more road segment metrics associated therewith (500) comprises: identifying each node of the plurality of nodes that is interconnected with one or more edges having a traffic disruption therealong (510); generating an undirected graph comprising the one or more edges having a traffic disruption therealong and each node interconnected therewith (520); and generating a compressed undirected graph comprising an aggregated node having associated therewith the one or more aggregated road segment metrics based on the one or more road segment metrics associated with each road segment represented by the one or more edges having a traffic disruption therealong (530). As will be appreciated, the method 500 may be implemented in the same manner as the method 300 using, for example, the processor 112 of the fleet management system 110 to process data received thereto and/or stored on the data storage 114.

As shown in FIG. 5 at 510, a plurality of nodes interconnected by one or more edges having a traffic disruption therealong may be identified. As described herein, each node may represent an intersection of road segments, and each edge may represent a road segment or a portion of a road segment. In some embodiments, a benchmark speed of and, if present, traffic disruption along a road segment may be associated with the edge or edges corresponding to that road segment. Alternatively, if the received traffic data is associated with a road network defined by a plurality of nodes interconnected by one or more edges, the systems and methods of the present disclosure may be implemented to determine benchmark speeds for, and whether traffic disruptions are present along, the one or more edges. As will be appreciated, each of the one or more edges having a traffic disruption therealong will also be associated with the one or more road segment metrics, as described herein.

At 520 of FIG. 5, an undirected graph of the nodes interconnected by the one or more edges having traffic disruptions therealong may be generated. As will be appreciated, an undirected graph may generally refer to a graph comprising a plurality of nodes interconnected by edges that are free from directionality. In the context of the present disclosure, the undirected graph may represent a simplified portion of the road network (e.g., of the road network 400), wherein, as described herein, the edges represent road segments or portions of road segments having traffic disruptions therealong and the nodes represent the intersections thereof. Thus, the generated undirected graph may represent a portion of the road network where a traffic bottleneck is present.

As will be appreciated, it may be the case that a node interconnected to an edge having a traffic disruption therealong may be proximate (e.g., in terms of geographical location) another node that is interconnected to another edge having a traffic disruption therealong but is not interconnected the other node via an edge. Such cases may arise when, for example, a traffic disruption is not identified along an edge that could interconnect the proximate nodes due to the edge (e.g., the corresponding road segment or portion of the road segment) having a different benchmark speed (e.g., a substantially lower benchmark speed) than the other edges interconnected to the proximate nodes, the edge not being identified in the traffic data (e.g., the corresponding road segment or portion of the road segment is missing from map information received from a map information provider), etc. Thus, it may be appropriate in such cases to include an omitted edge to interconnect the proximate nodes when generating the undirected graph so that all nodes and edges that may be useful for identifying a traffic disruption are included in the undirected graph. That is, in some embodiments, the generating of the undirected graph may comprise operating the at least one processor (e.g., the processor 112, 132) interconnecting proximate nodes between which at least a portion of a road segment is present by adding an omitted edge therealong.

As shown at 530 of FIG. 5, a compressed undirected graph may be generated. The compressed undirected graph may comprise an aggregated node having associated therewith one or more aggregated road segment metrics based on the one or more road segment metrics associated with each of the one or more edges of the undirected graph. Thus, the compressed undirected graph may comprise a single aggregated node representing a traffic bottleneck within the road network and the one or more aggregated road segment metrics associated therewith.

The compressed undirected graph may be generated using a number of techniques. For example, one method for compressing the undirected graph according to an embodiment of the present disclosure is illustrated in FIG. 6.

FIG. 6A shows an example undirected graph 600 (e.g., generated at 520 of FIG. 5). As described herein, the undirected graph 600 may comprise a plurality of nodes 610 (representing road segment intersections) and a plurality of edges 620 (representing road segments or portions of road segments) that have each been identified as having a traffic disruption therealong. As shown, each of the nodes 610 has a unique node ID associated therewith, represented by the numerical value included therein.

Once the undirected graph 600 is generated, the undirected graph 600 may be compressed by modifying the node ID of each of the nodes 610 to that of a minimum adjacent node ID. That is, for a selected one of the nodes 610, if an adjacent node 610 (i.e., interconnected via the same edge) has associated therewith a node ID that is a lower numerical value than that of the selected node 610, the node ID of the selected node 610 may be modified that that of the node ID that is the lower numerical value. FIG. 6B illustrates the process of modifying the node IDs of the nodes 610 to that of the minimum adjacent node IDs, which are represented by the numerical values contained within the boxes adjacent the nodes. As shown, if there is no minimum adjacent node ID available (i.e., there are no nodes 610 having a node ID that is a lower numerical value), the node ID may not be modified.

After modifying the node IDs, nodes 610 having identical node IDs may be merged to generate one or more merged nodes 612, as shown in FIG. 6C. As will be appreciated, due to the merging of nodes 610, the undirected graph 600 will have fewer nodes 610 and fewer edges 620. Thus, the merging of the nodes 610 may generate a partially compressed undirected graph 602. Further, as described herein, the edges 620 are associated with one or more road segment metrics. As will also be appreciated, as nodes 610 are merged based on their identical node IDs, the edges 620 interconnecting them will also be removed from the undirected graph 600. Thus, each of the merged nodes 612 may be associated with the one or more road segment metrics that were associated with each edge 620 interconnecting the nodes 610 prior to merging.

As described above, the compressed graph generated at 530 of FIG. 5 comprises an aggregated node having associated therewith one or more aggregated road segment metrics. Thus, the partially compressed undirected graph 602 may be further compressed by, for example, repeating the modifying of the node IDs and the merging of the nodes 610 and/or the nodes 612 until the compressed undirected graph comprising the aggregated node having associated therewith the one or more aggregated road segment metrics is generated. As shown in FIG. 6C, the node IDs of the nodes 610 and the nodes 612 of the partially compressed undirected graph 602 may be modified to that of the minimum adjacent node ID (again represented by the numerical values contained in the boxes adjacent the nodes 610 and the nodes 612).

Once the node IDs of the nodes 610 and nodes 612 are modified to that of the minimum adjacent node ID, the nodes 610 and the nodes 612 may be merged. In the example illustrated in FIG. 6C, each of the nodes 610 and the nodes 612 are modified to have an identical node ID. Thus, as shown in FIG. 6D the merging of the nodes 610 and the nodes 612 generates a compressed undirected graph 604, which comprises an aggregated node 614 having associated therewith the one or more aggregated road segment metrics, as described above. The one or more aggregated road segment metrics associated with the aggregated node 614 may be based on the one or more road segment metrics associated with the edges 620 interconnecting the nodes 610 and the nodes 612 prior to merging. However, as will be appreciated, the nodes 612 may also have one or more road segment metrics associated therewith resulting from a prior merging of nodes 610. As a result, the one or more aggregated road segment metrics associated with the aggregated node 614 may be based on the one or more road segment metrics previously associated with the interconnecting edges 620 and the nodes 612.

By generating the compressed undirected graph 604, the edges 620 that represent the plurality of adjacent road segments having a traffic disruption therealong, as well as the one or more road segment metrics associated therewith, may be aggregated, thereby identifying a traffic bottleneck having associated therewith one or more aggregated road segment metrics, as described above at 350 of FIG. 3. The inventors of the present disclosure found that the method of identifying the traffic bottleneck illustrated in FIG. 5 and FIG. 6 may have a number of advantages associated therewith. For example, the methods for identifying the traffic bottlenecks may be suitable for parallel implementations, allowing for dynamic and efficient distribution of processes to available computational resources, which, in turn, may allow for efficient large-scale bottleneck identification (e.g., world-wide bottleneck identification in less than about 3 hours). As will be appreciated, the systems and methods of the present disclosure may provide a substantial improvement over conventional techniques, which may take a similar or greater amount of processing time and/or processing power to identify traffic bottlenecks over a much smaller geographical area.

Now referring back to FIG. 3, at 360, each identified traffic bottleneck may be ranked based on one or more aggregated road segment metrics. Ranking the traffic bottlenecks may be particularly useful for commercial applications. For example, industries such as freight transport may be able to plan routes that minimize the impacts of traffic bottlenecks based on the one or more aggregated road segment metrics associated therewith.

The one or more aggregated road segment metrics may comprise an aggregation of each of the one or more road segment metrics associated with the plurality of adjacent road segments (i.e., those of the traffic bottleneck). For example, in some embodiments, the one or more aggregated road segment metrics may comprise an aggregated travel time metric, an aggregated speed metric, an aggregated direction metric, an aggregated load metric, an aggregated traffic disruption metric, an aggregated dimension metric, an aggregated travel time metric, and the like. Such aggregated metrics may be an average, a sum, etc. (or a percentile thereof) of the one or more road segment metrics associated with the plurality of adjacent road segments.

In some embodiments, the one or more aggregated road segment metrics may be determined using the one or more road segment metrics of the plurality of road segments as factors thereof. For example, in such embodiments, the one or more aggregated road segment metrics may comprise a travel time index (TTI), a buffer time index (BTI), a planning time index (PTI), a reliability cost, and/or the like, which, as will be appreciated, may be determined using the one or more road segment metrics described herein.

One aggregated road segment metric that the inventors of the present disclosure found to be useful is bottleneck concentration. Bottleneck concentration may be used to quantify the impact a traffic bottleneck has on a road network. In more detail, the bottleneck concentration may represent a percentage of a geographical area that is affected by the traffic bottleneck. The bottleneck concentration may be determined using the below equation:

$$\alpha_H = \frac{l(H)}{l(Conv(H) \cap G)}$$

In the above equation, "$\alpha_H$" is the bottleneck concentration, "I(H)" represents the length of the bottleneck (e.g., based on the total length of the road segments affected by the traffic bottleneck, or, put differently, that have a traffic disruption therealong), and "I(Conv(H)∩G)" represents the length of all of the road segments located within a minimum convex hull of the traffic bottleneck.

Bottleneck concentration may be a useful metric for the ranking of traffic bottlenecks, as the metric takes into account the spatial structure of the traffic bottlenecks. As well bottleneck concentration may be used for large-scale comparison between traffic bottlenecks over time.

In an embodiment, the traffic bottlenecks may be ranked based on a utility function. In more detail, various metrics (e.g., the one or more road segment metrics, the one or more aggregated road segment metrics) associated with each of the traffic bottlenecks may be input into a utility function, and a user may then rank the traffic bottlenecks based on the output of the utility function.

For example, in some embodiments, a utility function may use as factors thereof, one or more economic costs associated with the traffic bottlenecks. In such embodiments, the one or more economic costs may be determined from the one or more segment metrics and/or the one or more aggregated road segment metrics and may include, but are not limited to, temporal delay costs such as weight-based temporal delay costs. In some embodiments, the utility function may also use additional costs as factors thereof. Such additional costs may include, for example, social costs—i.e., social impacts resulting from traversing a bottleneck. Examples of social costs include, but are not limited to, a volume of greenhouse gas emissions, a unit social cost for emission of greenhouse gas, a predicted market share in terms of greenhouse gas emissions, and the like.

One example of a utility function that may be useful for ranking traffic bottlenecks is included below:

$$U(C, E) = \frac{T \times p_1}{\sigma_1} + \frac{V \times p_2}{\sigma_2}$$

In the above utility function, "T" represents an aggregated temporal delay cost (e.g., an aggregated weight-based temporal delay cost), "V" represents predicted volume of greenhouse gas emissions, "$p_1$" represents the unit economic loss for delay, "$p_2$" represents the unit social cost of greenhouse gas emissions, "$\sigma_1$" represents a normalization term based on predicted market share in terms of load, and "$\sigma_2$" represents a normalization term based on predicted market share in terms of greenhouse gas emissions volume. Further, as indicated herein, the particular parameters and/or factors considered by the utility function may be selected based on the needs of a user. For example, a user managing a freight transport fleet might factor different variables into a utility function than a user managing a service provider fleet.

Another example of a utility function that may be useful is included below:

$$U(C,S)=\beta_1 c_1+\ldots+\beta_n c_n+\beta_{n+1} s_1+\ldots+\beta_{n+m} s_m$$

wherein "β" is the weight parameter of the above utility function, $$\sum_{i=0}^{n+m} \beta_i = 1,$$

and economic costs and social costs are represented by a score $c \in C$ and $s \in S$ normalized from one or more metrics described above, respectively. Again, as described herein, the particular economic and social costs to be included in the utility function may be selected by a user.

The inventors of the present disclosure found that ranking the identified traffic bottlenecks based on a utility function such as those described above may be particularly useful for commercial applications. For example, while economic considerations are a key consideration for commercial industries, social considerations are becoming increasingly important, as such considerations may affect the public image or perception of a company, whether the company is subject to certain regulations (e.g., emissions regulations), and the like. Thus, ranking traffic bottlenecks based on a utility function associated therewith may provide an advantage over conventional techniques, which, as described herein, generally merely rely on metrics such as traffic speed and/or commercial vehicle hourly volume that do not take into consideration potential economic and social factors associated with the traffic bottlenecks.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). Programmable hardware such as FPGA can also be used as standalone or in combination with other devices. These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific, and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

Further, in the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. A system for identifying and ranking traffic bottlenecks, the system comprising:

at least one data storage operable to store traffic data associated with a road network comprising a plurality of road segments, the traffic data comprising vehicle speed data collected from a plurality of telematics devices installed in a plurality of vehicles operating within the road network, and the road network defined by a plurality of nodes interconnected by one or more edges, each node representing a road segment intersection and having a unique node ID associated therewith, and each edge representing at least a portion of one of the plurality of road segments; and at least one processor in communication with the at least one data storage, the at least one processor operable to:

determine a benchmark speed for each of the plurality of road segments;

determine, for each of the plurality of road segments, whether a traffic disruption is present by comparing the benchmark speed thereof to vehicle speed data collected from at least one vehicle operating therealong;

determine, for each of the plurality of road segments along which a traffic disruption is present, one or more road segment metrics associated therewith, the one or more road segment metrics comprising a weight-based temporal delay cost;

identify a traffic bottleneck by:

identifying each node of the plurality of nodes that is interconnected with one or more edges having a traffic disruption therealong, generating an undirected graph comprising the one or more edges having a traffic disruption therealong and each node interconnected therewith, and generating a compressed undirected graph comprising an aggregated node having associated therewith the one or more aggregated road segment metrics based on the one or more road segment metrics associated with each road segment represented by the one or more edges having a traffic disruption therealong by:

for each node of the undirected graph, modifying the node ID associated therewith to that of a minimum adjacent node ID, if present, merging nodes having identical node IDs to generate one or more merged nodes, each of the one or more merged nodes having associated therewith the one or more road segment metrics associated with each road segment represented by each edge interconnecting the nodes prior to merging, and repeating the modifying of the node IDs and the merging of the nodes having the identical node IDs until the compressed undirected graph comprising the aggregated node is generated;

rank each traffic bottleneck based on one or more aggregated road segment metrics associated therewith; and operate, based on the ranking of each traffic bottleneck, at least one of the plurality of telematics devices to communicate with one or more electrical control units that control a component of the vehicle in which the at least one telematics device is installed or one or more internal sensors thereof.

2. The system of claim 1, wherein the one or more road segment metrics comprise a speed metric, a travel time metric, a dimension metric, a direction metric, a load metric, a traffic disruption metric, or a combination thereof.

3. The system of claim 1, wherein the one or more aggregated road segment metrics comprise an aggregated travel time metric, an aggregated speed metric, an aggregated direction metric, an aggregated load metric, an aggregated traffic disruption metric, an aggregated dimension metric, an aggregated travel time metric, a travel time index (TTI), a buffer time index (BTI), a planning time index (PTI), a reliability cost, a bottleneck concentration, or a combination thereof.

4. The system of claim 1, wherein the at least one processor is operable to rank each traffic bottleneck based on a utility function that uses, as a factor thereof, one or more economic costs based on the one or more aggregated road segment metrics, and, optionally, one or more social costs.

5. The system of claim 1, wherein the at least one processor is operable to determine the benchmark speed based on a road segment speed limit and/or a maximum collected road segment vehicle speed.

6. The system of claim 1, wherein the plurality of vehicles are freight transport vehicles.

7. A method for identifying and ranking traffic bottlenecks, the method comprising operating at least one processor to:

receive traffic data associated with a road network comprising a plurality of road segments, the traffic data comprising vehicle speed data collected from a plurality of telematics devices installed in a plurality of vehicles operating within the road network, and the road network defined by a plurality of nodes interconnected by one or more edges, each node representing a road segment intersection and having a unique node ID associated therewith, and each edge representing at least a portion of one of the plurality of road segments;

determine a benchmark speed for each of the plurality of road segments;

determine, for each of the plurality of road segments, whether a traffic disruption is present by comparing the benchmark speed thereof to vehicle speed data collected from at least one vehicle operating therealong;

determine, for each of the plurality of road segments along which a traffic disruption is present, one or more road segment metrics associated therewith, the one or more road segment metrics comprising a weight-based temporal delay cost;

identify a traffic bottleneck by:

identifying each node of the plurality of nodes that is interconnected with one or more edges having a traffic disruption therealong, generating an undirected graph comprising the one or more edges having a traffic disruption therealong and each node interconnected therewith, and generating a compressed undirected graph comprising an aggregated node having associated therewith the one or more aggregated road segment metrics based on the one or more road segment metrics associated with each road segment represented by the one or more edges having a traffic disruption therealong by:

for each node of the undirected graph, modifying the node ID associated therewith to that of a minimum adjacent node ID, if present, merging nodes having identical node IDs to generate one or more merged nodes, each of the one or more merged nodes having associated therewith the one or more road segment metrics associated with each road segment represented by each edge interconnecting the nodes prior to merging, and repeating the modifying of the node IDs and the merging of the nodes having the identical node IDs until the compressed undirected graph comprising the aggregated node is generated;

rank each traffic bottleneck based on one or more aggregated road segment metrics associated therewith; and operate, based on the ranking of each traffic bottleneck, at least one of the plurality of telematics devices to communicate with one or more electrical control units that control a component of the vehicle in which the at least one telematics device is installed or one or more internal sensors thereof.

8. The method of claim 7, wherein the one or more road segment metrics comprise a speed metric, a travel time metric, a dimension metric, a direction metric, a load metric, a traffic disruption metric, or a combination thereof.

9. The method of claim 7, wherein the one or more aggregated road segment metrics comprise an aggregated travel time metric, an aggregated speed metric, an aggregated direction metric, an aggregated load metric, an aggregated traffic disruption metric, an aggregated dimension metric, an aggregated travel time metric, a travel time index (TTI), a buffer time index (BTI), a planning time index (PTI), a reliability cost, a bottleneck concentration, or a combination thereof.

10. The method of claim 7, wherein the ranking of each traffic bottleneck comprises operating the at least one processor to rank each traffic bottleneck based on a utility function that uses, as a factor thereof, one or more economic costs based on the one or more aggregated road segment metrics, and, optionally, one or more social costs.

11. The method of claim 7, wherein the determining of the benchmark speed comprises operating the at least one processor to determine the benchmark speed based on a road segment speed limit and/or a maximum collected road segment vehicle speed.

12. The method of claim 7, wherein the plurality of vehicles are freight transport vehicles.

13. A non-transitory computer readable medium having instructions stored thereon executable by at least one processor to implement a method for identifying and ranking traffic bottlenecks, the method comprising operating at least one processor to:

receive traffic data associated with a road network comprising a plurality of road segments, the traffic data comprising vehicle speed data collected from a plurality of telematics devices installed in a plurality of vehicles operating within the road network, and the road network defined by a plurality of nodes interconnected by one or more edges, each node representing a road segment intersection and having a unique node ID associated therewith, and each edge representing at least a portion of one of the plurality of road segments;

determine a benchmark speed for each of the plurality of road segments;

determine, for each of the plurality of road segments, whether a traffic disruption is present by comparing the benchmark speed thereof to vehicle speed data collected from at least one vehicle operating therealong;

determine, for each of the plurality of road segments along which a traffic disruption is present, one or more road segment metrics associated therewith, the one or more road segment metrics comprising a weight-based temporal delay cost;

identify a traffic bottleneck by:

identifying each node of the plurality of nodes that is interconnected with one or more edges having a traffic disruption therealong, generating an undirected graph comprising the one or more edges having a traffic disruption therealong and each node interconnected therewith, and generating a compressed undirected graph comprising an aggregated node having associated therewith the one or more aggregated road segment metrics based on the one or more road segment metrics associated with each road segment represented by the one or more edges having a traffic disruption therealong by:

for each node of the undirected graph, modifying the node ID associated therewith to that of a minimum adjacent node ID, if present, merging nodes having identical node IDs to generate one or more merged nodes, each of the one or more merged nodes having associated therewith the one or more road segment metrics associated with each road segment represented by each edge interconnecting the nodes prior to merging, and repeating the modifying of the node IDs and the merging of the nodes having the identical node IDs until the compressed undirected graph comprising the aggregated node is generated;

rank each traffic bottleneck based on one or more aggregated road segment metrics associated therewith; and operate, based on the ranking of each traffic bottleneck, at least one of the plurality of telematics devices to communicate with one or more electrical control units that control a component of the vehicle in which the at least one telematics device is installed or one or more internal sensors thereof.

* * * * *